United States Patent
Chuta et al.

[11] Patent Number: 5,138,209
[45] Date of Patent: Aug. 11, 1992

[54] SPINDLE MOTOR

[75] Inventors: Masanobu Chuta, Naka; Hiroyuki Yonei; Hideki Nishimura, both of Hikone; Yoshikiyo Nagashima, Kyoto, all of Japan

[73] Assignee: Nippon Densan Corporation, Kyoto, Japan

[21] Appl. No.: 651,141

[22] Filed: Feb. 6, 1991

[30] Foreign Application Priority Data

| Mar. 1, 1990 | [JP] | Japan | 2-50421 |
| Mar. 24, 1990 | [JP] | Japan | 2-74798 |
| Mar. 30, 1990 | [JP] | Japan | 2-86801 |

[51] Int. Cl.$^5$ .............. H02K 7/14; H02K 7/08; H02K 11/00; H02K 5/24
[52] U.S. Cl. .................. 310/67 R; 310/71; 310/90; 310/51
[58] Field of Search .......... 310/67 R, 71, 90, 156, 310/268, 51; 360/98.07, 99.04, 99.08

[56] References Cited

U.S. PATENT DOCUMENTS

| 3,441,886 | 4/1969 | Tveter | 310/90 |
| 4,701,651 | 10/1987 | Tanaka | 310/90 |
| 4,779,165 | 10/1988 | Elsaesser et al. | 310/156 |
| 4,843,500 | 6/1989 | Elsaesser et al. | 310/156 |
| 4,965,476 | 10/1990 | Lin | 310/67 R |
| 4,992,686 | 2/1991 | Heine et al. | 310/49 R |
| 5,001,581 | 3/1991 | Elsaesser et al. | 360/99.08 |
| 5,045,738 | 9/1991 | Hishida et al. | 310/67 R |

FOREIGN PATENT DOCUMENTS

| 0052134 | 3/1986 | Japan | 310/90 |
| 0930504 | 5/1982 | U.S.S.R. | 310/90 |

Primary Examiner—William H. Beha, Jr.
Assistant Examiner—C. LaBalle
Attorney, Agent, or Firm—McCormick, Paulding & Huber

[57] ABSTRACT

Disclosed is a spindle motor comprising: a housing, a hub member which is rotatable with respect to the housing and to which a recording member is attached, and a bearing arranged between the housing and the hub member and having an outer member which is rotatably attached thereto through the intermediation of a plurality of spherical members, the hub member being fixed to the above-mentioned outer member by press fitting or shrinkage fitting, and the inner periphery of the hub member being equipped with an annular recess in correspondence with a ball lodging grooved formed on the outer member.

5 Claims, 5 Drawing Sheets

SPINDLE MOTOR

FIELD OF THE INVENTION

This invention relates to a spindle motor for rotating a recording member such as a magnetic disc.

DESCRIPTION OF THE PRIOR ART

Generally, a rigid-shaft type spindle motor is equipped with a housing, a hub member which is rotatable with respect to this housing, and a bearing means arranged between the housing and the hub member. The hub member is fixed to the outer member of the bearing means, and a recording member such as a magnetic disc is attached in a predetermined manner to the hub member thus fixed. The bearing means consists of a unit bearing comprising a shaft member, an outer sleeve and a two rows of spherical members arranged between them, or a pair of ball bearings.

However, the fixing of the hub member to the outer member of the bearing means by press fitting or shrinkage fitting involves the following problem: the above-mentioned outer member has ball lodging grooves for lodging spherical members and the wall thickness of that portion of this outer member where the ball lodging grooves are formed is small. At the same time, it is extremely difficult to form with perfect roundness the inner periphery of the section where the hub member is attached. If the above-mentioned inner periphery is formed with poor roundness, the thin-walled portion of the above outer member, i.e., the section where the ball lodging grooves are formed, is somewhat deformed when performing press fitting or shrinkage fitting or as a result of temperature changes after the assembly of the motor. Such a deformation of the outer member prevents the movement and rotation of the spherical members of the bearing means from being effected smoothly, thus causing noise, vibration, NRRO, etc. in the motor and shortening the service life of the bearing means.

In such a rigid-shaft type motor, a rotor magnet is attached to the inner periphery of the hub member, and the stator is arranged inside this rotor magnet. Further, lead wires from the armature windings of the stator (in the case of a motor in which a circuit substrate is arranged inside the hub member, lead wires from this circuit substrate) extend to the exterior of the motor to allow electrical connection with a control means provided on the driving device side.

Conventionally, however, a through-hole extending in the axial direction has been formed in the stationary shaft member, the above lead wires being allowed to extend to the exterior through this through-hole. The formation of such a through-hole for allowing the lead wires to extend to the exterior is not easy achieve. In addition, the operation of guiding the lead wires to the exterior is difficult.

SUMMARY OF THE INVENTION

A first object of this invention is to provide a spindle motor in which the outer member of the bearing means can be prevented from being deformed when fixing the hub member or as a result of temperature changes after the assembly.

A second object of this invention is to provide a spindle motor which has a relatively simple structure and in which it is relatively easy to guide the lead wires to the exterior.

In accordance with this invention, there is provided, in view of the above first object, a spindle motor comprising: a housing, a hub member which is rotatable with respect to the housing and to which a recording member is attached, and a bearing means arranged between the housing and the hub member and having an outer member which is rotatably attached thereto through the intermediation of a plurality of spherical members, the hub member being fixed to the outer member by press fitting or shrinkage fitting, and the inner periphery of the hub member being equipped with an annular recess in correspondence with a ball lodging groove formed on the outer member.

Further, in accordance with this invention, there is provided, in view of the above second object, a spindle motor comprising: a housing, a shaft member fixed to the housing, a hub member which is rotatably attached to the housing through the intermediation of a bearing means, a rotor magnet attached to the hub member, and a stator arranged in such a manner as to face the rotor magnet, part of the outer periphery Of the shaft member being cut out to form a guide-out space extending in the axial direction, and lead wires electrically connected to windings of the stator being arranged in the above-mentioned guide-out space.

Other objects and features of this invention will be easily appreciated from the following description.

DETAILED DESCRIPTION OF THE PREFERRED EMBODIMENTS

In the following, the present invention will be described in more detail with reference to the accompanying drawings.

First Embodiment

The first embodiment of the spindle motor in accordance with this invention will be described with reference to FIGS. 1 and 2.

Figure 1:
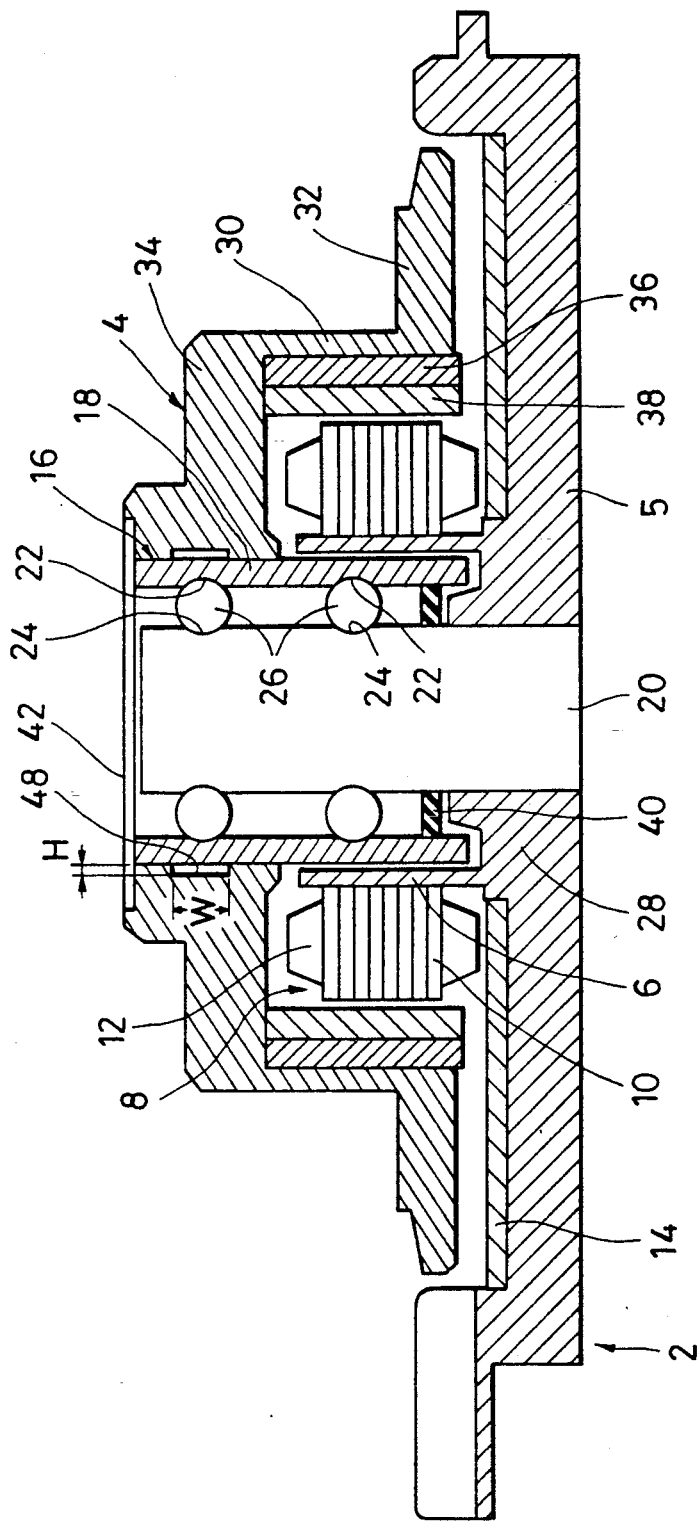
FIG. 1 is a sectional view showing a first embodiment of the spindle motor in accordance with this invention.

In FIG. 1, the spindle motor shown is equipped with a housing 2 and a hub member 4. The housing 2 has a substantially cylindrical housing body 5, in the central section of which is formed a round hole. An upwardly protruding hollow cylindrical wall 6 is integrally formed in the periphery defining this hole. Attached to the outer peripheral surface of the cylindrical wall 6 is a stator 8, which has stator cores 10 fixed to the cylindrical wall 6 and armature windings 12 wound around the stator cores 10. Arranged on the inner surface (the upper surface as seen in FIG. 1) of the housing body 5 is a circuit substrate 14, which is equipped with a drive circuit (not shown) including a Hall-effect device for controlling the rotation of a hub member 4. This housing 2 is attached to the frame (not shown) of a driving device.

A bearing means 16 is arranged between the housing 2 and the hub member 4. The bearing means 16 shown consists of a unit bearing, which is equipped with a cylindrical hollow outer sleeve 18 (which constitutes the outer member), and a shaft member 20 (which constitutes the inner member) arranged inside this outer sleeve 18. Formed respectively at each end of the inner peripheral surface of the outer sleeve 18 are annular ball lodging grooves 22, and formed on the outer peripheral surface of the shaft member 20 are annular ball lodging grooves 24, which respectively correspond to the ball lodging grooves 22. The ball lodging grooves 22 of the outer sleeve 18 and the ball lodging grooves 24 of the shaft member 20 define ball lodging spaces having a substantially circular section. A plurality of spherical members 26 are arranged in these ball lodging spaces in such a manner as to be rotatable and movable along these spaces. Thus, the outer sleeve 18 and the shaft member 20 are rotatable with respect to each other through the intermediation of two rows of spherical members 26 spaced from each other in the axial direction of the shaft member 20.

In the first embodiment, an annular protrusion 28 radially protruding inwards is provided on the base section of the cylindrical wall 6 of the housing body 5. One end section (the lower section) of the shaft member 20 of the bearing means 16 protrudes outwardly beyond one end of the outer sleeve 18. This protruding end section is fixed to the above annular protrusion 28 by press fitting or the like.

The hub member 4 has a cylindrical hub body 30, a flange section 32 provided at one end (the lower end) of the hub body 30, and an end wall section 34 provided at the other end (the upper end) of the hub body 30, the end wall section 34 being fixed to the other end of the outer sleeve 18. The hub body 32 covers the stator 8 attached to the cylindrical wall 6 of the housing 2 and has attached to its inner peripheral surface a rotor magnet 38 through the intermediation of a yoke member 36. A recording member (not shown) such as a magnetic disc is placed in a predetermined manner on the flange section 32.

To prevent the recording member (not shown) from being stained with the grease or the like used in the bearing means 16, the motor shown adopts the following arrangement: the distance between the inner peripheral surface of the outer sleeve 18 and the outer peripheral surface of the cylindrical wall 6 is made small, and the length of these sections which radially overlap each other is made sufficiently large (in the vertical direction as seen in FIG. 1), thereby effectively preventing particles of grease or the like from passing therebetween. Further, the embodiment includes an annular seal member 40 arranged at one end of the inner peripheral surface of the outer sleeve 18. The free end section of the seal member, which may be formed, for example, of synthetic rubber, is close to or in contact with the outer peripheral surface of the shaft member 20, thereby preventing grease or the like from getting into the gap between the outer sleeve 18 and the shaft member 20. Further, a cap member 42 is attached to the end wall section 34 of the hub member 4. The cap member 42 seals up the other end of the bearing means 16 so as to prevent grease or the like from leaking therethrough.

Figure 2:
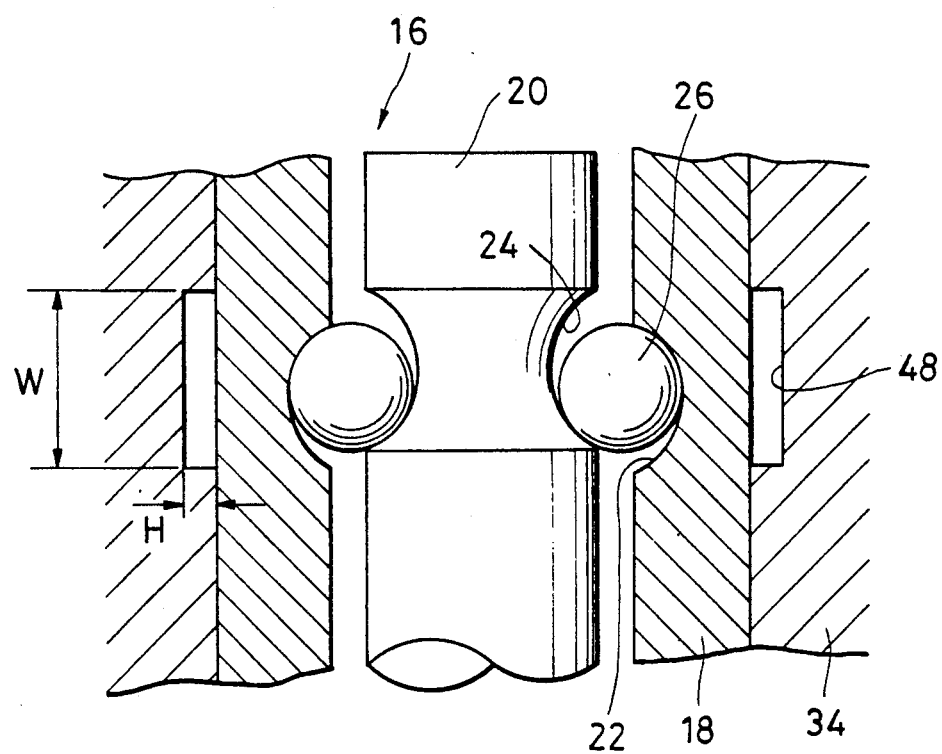
FIG. 2 is an enlarged sectional view showing a part of the spindle motor of FIG. 1.

To avoid any deformation likely to occur when fixing the hub member 4 to the outer sleeve 18 of the bearing means 16 by press fitting or as a result of temperature changes after the assembly of the motor, the first embodiment further adopts the following arrangement:

Referring to FIG. 2 along with FIG. 1, this embodiment includes an annular recess 48 formed on the inner peripheral surface of the end wall section 34 of the hub member 4. This annular recess 48 is provided in correspondence with one of the ball lodging grooves 22 formed on the outer sleeve 18. (In the example shown, it corresponds to the ball lodging groove 22 situated in the other end section of the outer sleeve 18 because in this example the hub member 4 is fixed to the other end section of the sleeve.) As shown in FIG. 2 in an enlarged state, the annular recess 48 serves to prevent the hub member 48 from directly acting on the outer peripheral surface of the outer sleeve 18. Thus, it is desirable that its width W be substantially the same as or somewhat larger than that of the ball lodging groove 22. Its depth H may be in the range of approximately 30 to 100 $\mu$m. While the sectional configuration of the annular recess 48 may, as in this embodiment, be a rectangular one, it is also possible for the section to have some other arbitrary configuration such as an arc-like one.

The above-described spindle motor has the following feature: in a spindle motor having no annular recess 48, substantially the entire area of the inner peripheral surface of the hub member 4 will act on the outer sleeve 18 when the hub member is fixed by press fitting. Thus, if the above-mentioned round hole in the end wall section 34 of the hub member 4 is formed with poor roundness, especially the thin-walled section of the outer sleeve 18 (the section where the ball lodging groove 22 is formed) is likely to suffer deformation, which will cause noise, vibration, NRRO, etc. to be generated during the rotation of the hub member 4. In the above-described spindle motor, in contrast, the presence of the annular recess 48 helps to substantially prevent the hub member 4 from coming into contact with the thin-walled section, i.e., the section where the ball lodging groove 22 is formed, when it is fixed by press fitting. Accordingly, the above-mentioned thin-walled section of the outer sleeve 18 is not deformed even if the round hole of the end wall section 34 of the hub member 4 is formed with rather poor roundness, thus avoiding noise, vibration, NRRO, etc. which would be generated if the outer sleeve 18 were deformed. Further, since this annular recess 48 prevents the hub member 4 from coming into contact with the above-mentioned thin-walled section of the outer sleeve 18, it also helps to avoid deformation in this thin-walled section, which would otherwise be caused by temperature changes after the assembly.

While in the first embodiment the hub member 4 is fixed to the outer sleeve 18 of the bearing means 16 by press fitting, it is also possible to fix it by shrinkage fitting. The same effect can also be attained in that case by providing an annular recess 48 on the inner peripheral surface of the hub member 4. Further, an adhesive may be used in combination with the press or shrinkage fitting.

Second Embodiment

Next, the second embodiment of the spindle motor in accordance with this invention will be described with reference to FIGS. 3 and 4.

Figure 3:
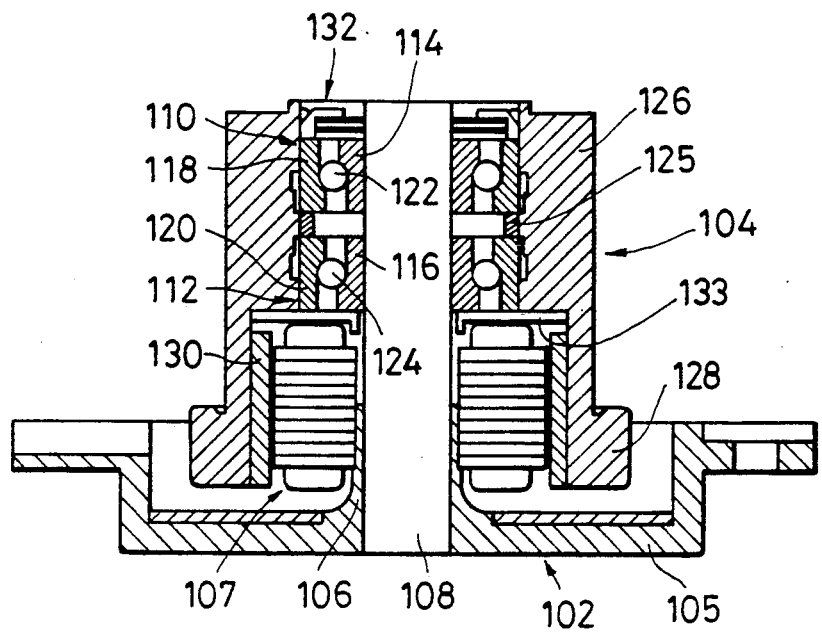
FIG. 3 is a sectional view showing a second embodiment of the spindle motor in accordance with this invention.

As shown in FIG. 3, the spindle motor of the second embodiment is also equipped with a housing 102 and a hub member 104. The housing 102 has a substantially round housing body 105, in approximately the central portion of which is integrally formed a cylindrical wall 106 extending substantially upwards in the vertical direction. A stator 107 is attached to the outer peripheral surface of this cylindrical wall 106.

One end section (the lower end section) of a shaft member 108 is fixed to the cylindrical wall 106 of the housing 102 by press fitting or the like. A hub member 104 is rotatably attached to the other end of this shaft member 108 through the intermediation of a pair of bearing members 110 and 112 (constituting the bearing means). The bearing members 110 and 112 consist of ordinary ball bearing members. They are respectively equipped with inner races 114 and 116 (which constitute the inner members) fixed to the outer peripheral surface of the shaft member 108 by means of an adhesive or the like, and outer races 118 and 120 (which constitute the outer members) arranged outside the inner races 114 and 116. Ball lodging grooves are respectively formed on the outer peripheral surfaces of the inner races 114 and 116. Ball lodging grooves are also respectively formed on the inner peripheral surfaces of the outer races 118 and 120. A plurality of spherical members 122 and 124 are respectively arranged in the ball lodging spaces defined by these ball lodging grooves. Further, an annular spacer member 125 is arranged between the outer races 118 and 120.

The hub member 104 is equipped with a cylindrical hub body 126. Integrally formed in one end section (the lower end section) of this hub body 126 is a flange section 128 protruding radially outwards. In the second embodiment, the other end section of the hub body 126 is fixed to the outer races 118 and 120 of the bearing members 110 and 112 by press fitting or the like, and the hub member 104 is rotatably supported by the shaft member 108 through the intermediation of the bearing members 110 and 112. One end section of the hub body 126 has an inner diameter larger than that of the other end section thereof. Attached to the inner peripheral surface of this one end section is a rotor magnet 130, which is arranged outside the stator 107 in such a manner as to face it.

Arranged outside one (the upper) bearing member 110 is a magnetic fluid seal mechanism 132, and arranged outside the other (the lower) bearing member 112 is a cap member 133 for sealing. The magnetic fluid seal mechanism 132 has an annular permanent magnet 134 and a pair of pole pieces 136 respectively arranged on each side of this permanent magnet 134. These components are attached to a bush member 138, which is attached to the inner peripheral surface of the other end section of the hub member 104.

Figure 4:
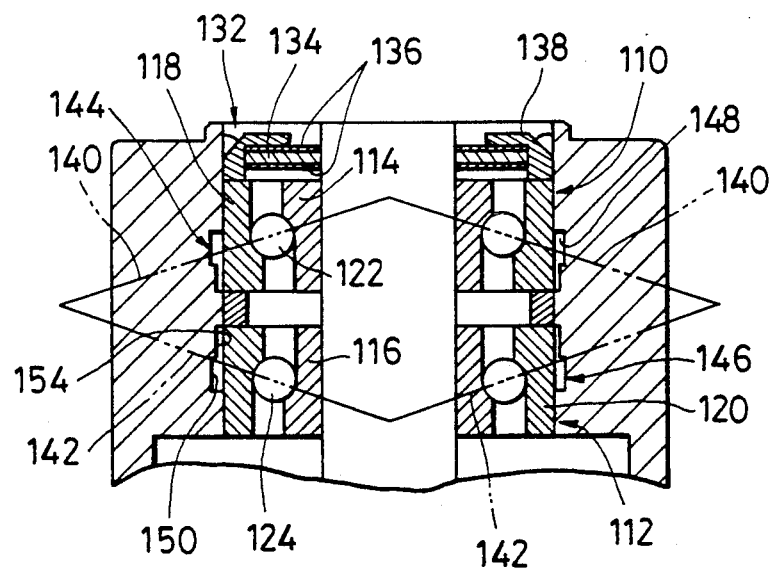
FIG. 4 is an enlarged sectional view showing a part of the spindle motor of FIG. 3.

In the second embodiment, the following arrangement is adopted in order to avoid deformation which may occur when fixing the hub member 104 by press fitting or as a result of temperature changes: referring mainly to FIG. 4, the pair of bearing members 110 and 112 are fixed in a pre-loaded state such that their inner races 114 and 116 are biased toward each other. Thus, as can be easily understood, in one bearing member 110, the outer race 118, the plurality of spherical members 122, and the inner race 114 are (as seen in the sectional view of FIG. 4) in contact with each other in the direction of axes 140 which are downwardly inclined radially outwards with respect to a horizontal axis, and, in the other bearing member 112, the outer race 120, the plurality of spherical members 124, and the inner race 116 are likewise in contact with each other in the direction of axes 142 which are inclined upwardly radially outwards with respect to the horizontal axis. In this respect, on the side of the bearing member 110, an annular recess 144 is formed in that section of the inner peripheral surface of the hub member 104 which corresponds to the lower section of the outer race 118 (the lower half thereof situated in the inclining direction of the axis 140). This annular recess 144 extends from the lower end of the outer race 118 up to the section corresponding to the position where the spherical members 122 and the outer race 118 are in contact with each other or somewhat beyond that. On the side of the bearing member 112, an annular recess 146 is formed in that section of the inner peripheral surface of the hub member 104 which corresponds to the upper section of the outer race 120 (the upper half thereof situated in the inclining direction of the axis 142). This annular recess 146 extends from the upper end of the outer race 120 down to the section corresponding to the position where the spherical members 124 and the outer race 120 are in contact with each other or somewhat beyond that. As shown in FIG. 4 in an enlarged state, the annular recesses 144 and 146 are composed of relatively deep first recess portions 148 and 150 and relatively shallow second recess portions 152 and 154. It is desirable that the first recess portions 148 and 150 be arranged in correspondence with the ball lodging grooves in the outer races 118 and 120 and that the second recess portions 152 and 154 respectively extend from the first recess portions 148 and 150 to the side of the above axes 140 and 142. Further, when fixing the hub member 104, it is desirable that an adhesive be used in combination with press fitting, etc. and that the hub member 104 be supported to some degree by the outer races 118 and 120 at least at the second recess portions 152 and 154 through the intermediation of the adhesive layer. The depth of the first recess portions 148 and 150 of the annular recesses 144 and 146 may, as in the first embodiment, be in the range of approximately 30 to 100 $\mu$m, with their sectional configuration being rectangular, etc. The depth of the second recess portions 152 and 154 may be less than half the depth of the first recess portions 148 and 150. Thus, also in the second embodiment, annular recesses 144 and 146 are provided in those sections of the hub member 104 which correspond to the ball lodging grooves of the outer races 118 and 120, so that the thin-walled portions of the outer races 118 and 120 (the portions where the ball lodging grooves are formed) do not come into direct contact with the inner peripheral surface of the hub member 104. Thus, as in the first embodiment, deformation which may occur due to the press fitting or to temperature changes can be avoided, thereby protecting the motor from noise, vibration, NRRO, etc. Further, thanks to the provision of the first recess portions 148 and 150 in correspondence with the ball lodging grooves of the outer races 118 and 120 and to the provision of the second recess portions 152 and 154 extending therefrom, the supporting span of the bearing members 110 and 112 is large, thereby making it possible to reliably support the hub member 104.

Further, also in this second embodiment, the hub member 104 may be fixed by shrinkage fitting, which means the above arrangement can also be applied to the case where shrinkage fitting is adopted.

Third Embodiment

The third embodiment of the spindle motor in accordance with this invention will be described with reference to FIGS. 5 and 6.

Figure 5:
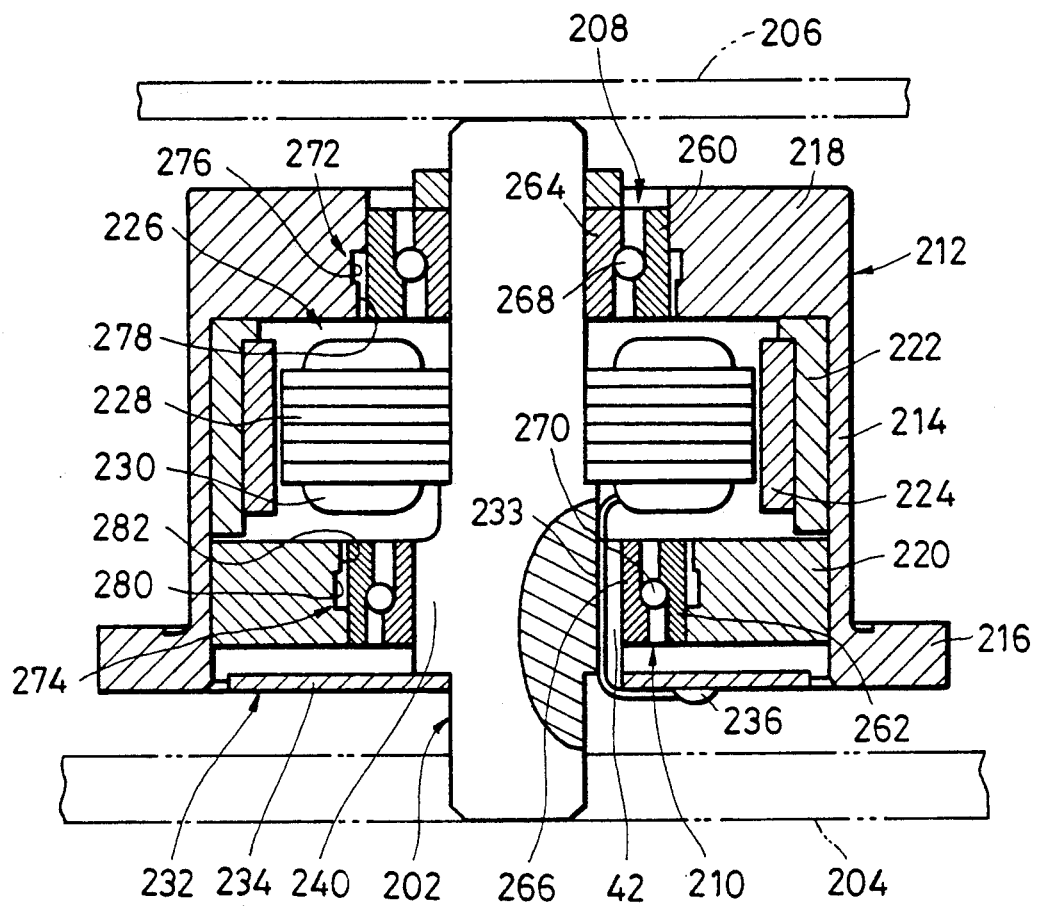
FIG. 5 is a sectional view showing a third embodiment of the spindle motor in accordance with this invention.
Figure 6:
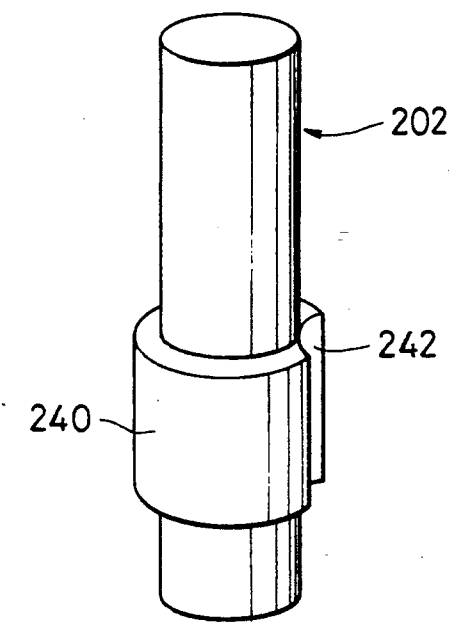
FIG. 6 is a perspective view showing the shaft member of the spindle motor of FIG. 5.

In FIG. 5, the spindle motor of the third embodiment is equipped with a stationary shaft member 202, one end section (the lower end section) of which is fixed to the lower frame 204 (which functions as a housing) of the driving device by press fitting or the like, and the other end section of which is fixed to the upper frame 206 of the driving device by means of mounting screws (not shown). One end section of the shaft member 202 may, as in the second embodiment, be attached to the lower frame 204 through the intermediation of a housing, and the other end section of the shaft member 202 may not be fixed to the upper frame 206.

A hub member 212 is rotatably attached to the stationary shaft member 202 through the intermediation of a pair of bearing members 208 and 210 (which constitute the bearing means). The hub member 212 has a cylindrical hub body 214, which has at one end thereof a flange section 216 and, at the other end thereof, an end wall section 218. In the third embodiment, the end wall section 218 of the hub member 212 is rotatably supported by the shaft member 202 through the intermediation of one bearing member 208, and one end section of the hub body 214 is rotatably supported through the intermediation of an annular bush member 220 and the other bearing member 210. A rotor magnet 224 is attached to the inner peripheral surface of the hub body 214 (more specifically, that section of the inner peripheral surface between the end wall section 218 and the bush member 220) through the intermediation of a yoke member 222.

Arranged inside the rotor magnet 224 is a stator 226, which has stator cores 228 attached to the middle section of the shaft member 202 (the section between the pair of bearing members 208 and 210) and armature windings 230 wound around these stator cores 228. Further, arranged outside the other bearing member 210 is a circuit means 232 for controlling the rotation of the hub member 212. The circuit means 232 has a circuit substrate 234 fixed to the shaft member 202. This circuit substrate 234 is equipped with various electric devices for controlling the rotation of the rotor magnet 214. The armature windings 230 are connected, as described below, to a predetermined terminal 236 on the circuit substrate 234 through lead wires 233 (which constitute the lead means), and a lead section (not shown) extending from the circuit substrate 234 is connected to a terminal means (not shown) of the driving device.

Also in this third embodiment, an arrangement similar to that of the second embodiment is adopted in order to avoid deformation in the outer races 260 and 262 of the bearing members 208 and 210. That is, the pair of bearing members 208 and 210 are fixed in a pre-loaded state such that the inner races 264 and 266 are biased toward each other. Thus, as in the second embodiment, in one bearing member 208, the outer race 260, a plurality of spherical members 268 and the inner race 264 are in contact with each other in the direction of axes which are inclined downwardly radially outwards with respect to a horizontal axis, and, in the other bearing member 210, the outer race 262, a plurality of spherical members 270 and the inner race 266 are in contact with each other in the direction of axes which are inclined upwardly radially outwards with respect to the horizontal axis. In this respect, on the side of the bearing member 208, an annular recess 272 is formed in that section of the inner peripheral surface in the other end section of the hub member 212 which corresponds to the lower section of the outer race 260. Likewise, on the side of the bearing member 210, an annular recess 274 is formed in that section of the inner peripheral surface of the annular bush member 240 which corresponds to the upper section of the outer race 262. The annular recess 272 includes a relatively deep first recess portion 276 which is arranged in correspondence with the ball lodging groove of the outer race 260, and a relatively shallow second recess portion 278 which extends downwards (as seen in FIG. 5) from the first recess portion 276. Likewise, the other annular recess 274 includes a relatively deep first recess portion 280 which is arranged in correspondence with the ball lodging groove of the outer race 262, and a relatively shallow second recess portion 282 which extends upwards (as seen in FIG. 5) from the first recess portion 280. Accordingly, also in this third embodiment, an effect similar to that of the second embodiment can be attained.

Next, the manner in which the lead wires 233 are guided to the exterior will be described with reference to FIGS. 5 and 6. In the example shown, a large diameter section 240 whose outer diameter is larger than that of the rest is integrally formed in the lower section of the shaft member 202 (the section where the other bearing member 210 is attached). This large diameter section 240 may be formed separately from the shaft member 202 and fixed to it by press fitting or the like. A part of the large diameter section 240 is cut so as to form a cutout 242 having an arc-like sectional configuration. The cutout 242 formed in the large-diameter section 240 defines, together with the other bearing member 210 attached to the outer peripheral surface of the large diameter section 240, a guide-out space for the lead wires 233, thus allowing the space inside the hub member 204 to communicate with the exterior. When attaching the stator 226 to the shaft member 202, the lead wires 233 (one end of each of which is electrically connected to the associated armature winding 230) extending from the armature windings 230 are guided to the exterior through the guide-out space defined by the above cutout 242, the other end of each lead wire 233 being connected to the terminal 236 of the circuit substrate 234 by soldering or the like.

In the spindle motor described above, a guide-space is realized by forming, for example, a cutout 242 in a large diameter section 240 provided on the shaft member 202. Accordingly, there is no need for forming a through-hole in the shaft member 202 as in the prior art. The guide-out space can be formed through a relatively simple machining, and the operation of guiding the lead wires 233 to the exterior through this guide-out space can be carried out with ease.

Figure 7:
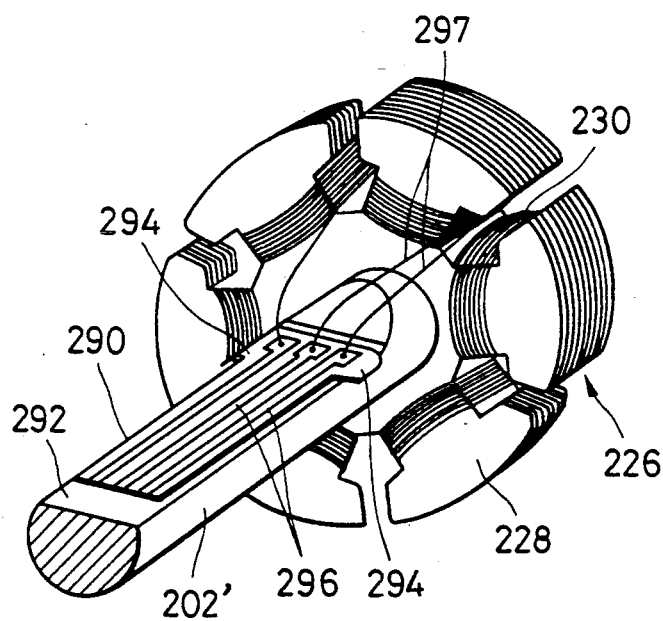
FIG. 7 is a perspective view showing a variation of the shaft member.

FIG. 7 shows a variation of the shaft member. In this variation, the shaft member 202' has a substantially uniform diameter. The guide-out space is defined by cutting out one end section of this shaft member 202' in such a manner that it assumes a substantially D-shaped section. Further, in this variation, the lead means consists of a flexible substrate 290, which is attached to that surface 292 of the shaft member 202' which is generated by the cutting. This flexible substrate 290 can be glued onto the above surface 292. It is desirable that gluing protrusions 294 be provided at one end of the flexible substrate 290 so that the gluing can be effected reliably. The flexible substrate 290 includes a lead section 296 extending from one to the other end thereof. The respective ends 297 of the armature windings 230 are electrically connected to one end section of the lead section 296. Also in this variation, the guide-out space can be formed solely by cutting out a part of the shaft member 202' so that it assumes a D-shaped section, with the operation of guiding the lead means to the exterior being easy to perform.

While the third embodiment has been described as applied to the type of motor in which the circuit substrate 232 is arranged outside the pair of bearing members 208 and 210, it can also be applied to the type of motor in which the circuit substrate is arranged in the space between the pair of bearing members 208 and 210. In that case, the lead wires extending from the circuit substrate are guided to the exterior through the above guide-out space.

While preferred embodiments of the spindle motor in accordance with this invention have been described, it is to be understood that this invention is not limited to these embodiments and that various changes and modifications may be made without departing from the scope of this invention.

we claim:

1. A spindle motor comprising: a housing, a hub member which is rotatable with respect to said housing and to which a recording member may be attached, and a bearing means arranged radially between said housing and said hub member, said bearing means including a pair of bearing members each with grooved inner and outer races and spherical bearings therebetween, said pair of bearing members being arranged with a predetermined axial space therebetween and being preloaded, said hub member being rotatably supported through the intermediation of said pair of bearing members, the inner periphery of said hub member being formed with a pair of annular recesses, and said annular recesses being formed in axial correspondence respectively with ball receiving grooves in the respective outer races of said pair of bearing members, and said recesses extending axially in the direction in which the outer races of each of said pair of bearing members are in contact with the associated spherical bearing members wherein each said annular recess has a first portion formed in axial correspondence with its associated ball receiving groove and a second recess portion extending in the axial direction from said first recess portion, said first recess portion being deeper than said second recess portion.

2. A spindle motor as claimed in claim 1, wherein said pair of bearing members are arranged in one end section of said shaft member, which is fixed to a bracket, a stator being arranged on the other end side of said shaft member.

3. A spindle motor comprising: a housing, a shaft member fixed to said housing, a hub member which is rotatably attached to said housing through the intermediation of a bearing means, a rotor magnet attached to said hub member, and a stator arranged in such a manner as to face said rotor magnet, part of the outer periphery of said shaft member being cut out to form a guide-out space extending in the axial direction, part of said shaft member being formed as a large diameter section whose outer diameter is larger than that of the rest, said guide-out space being formed by radially cutting out a part of said large diameter section, and a lead means electrically connected to windings of said stator being arranged in said guide-out space.

4. A spindle motor as claimed in claim 3, wherein said guide-out space is formed by cutting out a part of said large diameter section of said shaft member in an arc-like fashion.

5. A spindle motor comprising: a housing, a shaft member fixed to said housing, a hub member which is rotatably attached to said housing through the intermediation of a bearing means, a rotor magnet attached to said hub member, and a stator arranged in such a manner as to face said rotor magnet, part of the outer periphery of said shaft member being cut out to form a guide-out space extending in the axial direction, the outer diameter of said shaft member being uniform from one to the other end thereof, and said guide-out space being formed by cutting out one end section of said shaft member in such a manner that it assumes a substantially D-shaped sectional configuration, and a lead means electrically connected to windings of said stator and arranged in said guide-out space.

* * * * *